United States Patent [19]
Yuzawa et al.

[11] Patent Number: 5,847,352
[45] Date of Patent: Dec. 8, 1998

[54] METHOD AND APPARATUS FOR ELECTRICAL DISCHARGE MACHINING

[75] Inventors: Takashi Yuzawa; Takuji Magara, both of Tokyo, Japan

[73] Assignee: Mitsubishi Denki Kabushiki Kaisha, Tokyo, Japan

[21] Appl. No.: 853,483

[22] Filed: May 9, 1997

[30] Foreign Application Priority Data

Oct. 31, 1996 [JP] Japan ................................ 8-290940

[51] Int. Cl.⁶ .............................. B23H 1/00; B23H 7/18; B23H 7/20
[52] U.S. Cl. .................................. 219/69.17; 219/69.13; 219/69.16
[58] Field of Search ............................ 219/69.16, 69.17, 219/69.13, 69.2; 364/474.04

[56] References Cited

U.S. PATENT DOCUMENTS

| | | | |
|---|---|---|---|
| 3,591,761 | 7/1971 | Bederman et al. | 219/69.13 |
| 4,827,213 | 5/1989 | Spaude | 219/69.16 |
| 4,891,487 | 1/1990 | Nakata | 219/69.16 |
| 5,051,554 | 9/1991 | Tsukamoto | 219/69.16 |
| 5,354,961 | 10/1994 | Diot et al. | 219/69.2 |

FOREIGN PATENT DOCUMENTS

| | | |
|---|---|---|
| 1-205916 | 8/1989 | Japan . |
| 1-205917 | 8/1989 | Japan . |
| 5-345228 | 12/1993 | Japan . |
| 6-719 | 1/1994 | Japan . |
| 7-9254 | 1/1995 | Japan . |
| 8-158280 | 6/1996 | Japan . |

*Primary Examiner*—Geoffrey S. Evans
*Attorney, Agent, or Firm*—Sughrue, Mion, Zinn, Macpeak & Seas, PLLC

[57] ABSTRACT

An electric discharge machining apparatus and method are provided first having a data storage for storing initial machining conditions such as a two-dimensional outline path for a machined form, dimensions of the machined form, a feed rate in the axial direction of an electrode for a given movement of the tool electrode in the horizontal direction, and an interval period of inline measurement. In addition, the apparatus measures a machining depth at each interval period of inline measurement. The apparatus also computes machining parameters such as a machining depth for each machining pass, a number of remaining passes of machining which are to be executed, and also increments an outline offset according to the measured machining depth. An electrode position control then provides positional control of a tool electrode according to the computed machining parameters.

8 Claims, 13 Drawing Sheets

FIG.7A — MACHINED FORM, W, θ

FIG.7B — OUTLINE PATH, 1

OFFSET VALUE CHANGED EACH ONE OUTLINE PATH

FIG.8A INITIAL OUTLINE PATH

FIG.8C LAST OUTLINE PATH

TIMES OF MEASUREMENT
: 3 TIMES

TIMES OF MEASUREMENT
: A × 2 TIMES

TIMES OF MACHINING IN EACH MEASURING ZONE $a >> b$ (FIRST MACHINING)
TOTAL TIME FOR MACHINING = TIME FOR ELECTRIC DISCHARGE MACHINING + TIME FOR MEASUREMENT

SECOND MACHINING AND ON
TOTAL TIME FOR MACHINING ≒ TIME FOR ELECTRIC DISCHARGE MACHINING

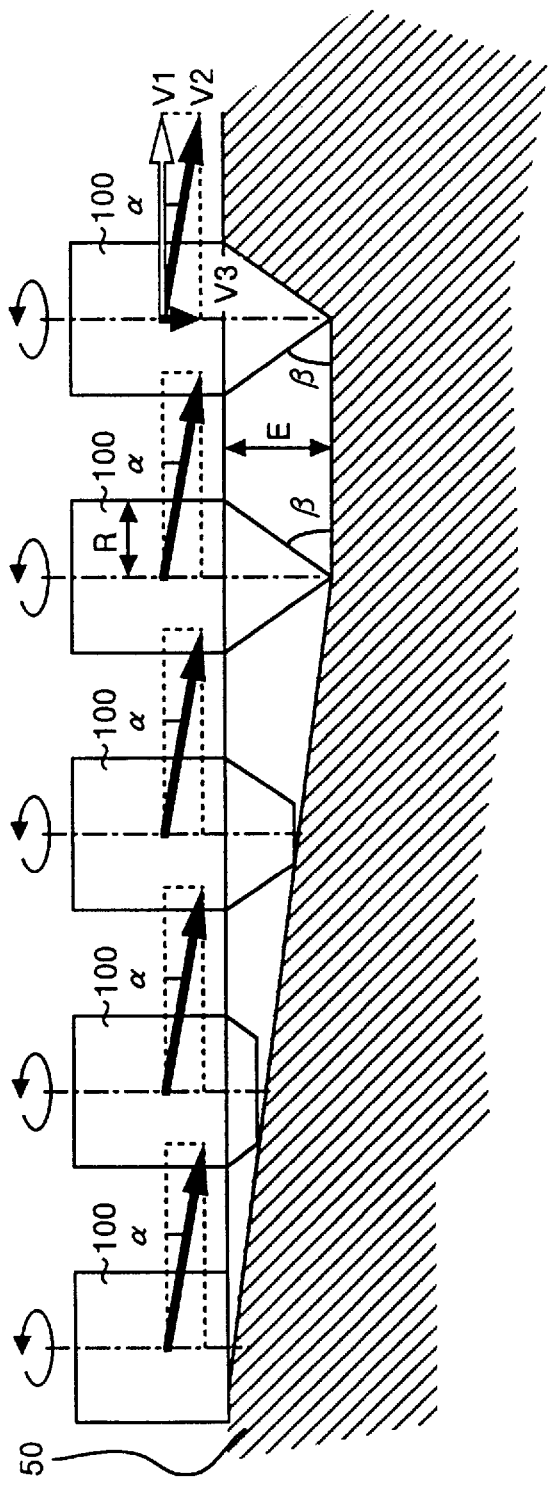

METHOD AND APPARATUS FOR ELECTRICAL DISCHARGE MACHINING

FIELD OF THE INVENTION

The present invention relates to an electric discharge machining apparatus as well as an electric discharge machining method, and more particularly to an electric discharge machining apparatus for executing three-dimensional machining using a simple-formed tool electrode as well as an electric discharge machining method using the same.

BACKGROUND OF THE INVENTION

Conventionally, there has been known an electric discharge machining apparatus which can machine a work into a desired three-dimensional form using a tool electrode having a simple form such as a cylindrical form, a pillar form, and a prism form or the like by providing three-dimensional control to the tool electrode with a numerical value control means. In this type of electric discharge machining apparatus, it is not required to manufacture a forming tool electrode with a complicated three-dimensional form, which makes it possible to reduce a mold manufacturing cost as well as a period of time required for the manufacture. Also a simple-formed tool electrode is used for a tool electrode for machining, which makes it possible to easily build up a CAM system as well as to expect automation of the machining processes as well.

However, this type of electric discharge machining apparatus has problems concerning depletion of the tool electrode or precision of a machined form as compared to electric discharge machining by the forming tool electrode because the electric discharge machining apparatus machines a wide area with the simple-formed tool electrode thereof.

In order to solve these problems, there is disclosed an invention in Japanese Patent Laid-Open Publication No. HEI 5-345228 that electric discharge machining is executed with high precision by controlling correction for depletion of the tool electrode. FIG. 14 shows a principle of that type of electric discharge machining.

As shown in FIG. 14, by sending a cylindrical tool Electrode 100 on the skew with an angle α to the surface for electric discharge machining of a work 50 for processing the work while it is rotated, a steady state of the work can be realized at the position d and on (a position e) where an outline form and a machining depth of the tool electrode 100 does not change through a transient state from the position a to the position d where an outline form and a machining depth of the tool electrode 100 change.

If the work is machined under machining conditions causing substantial depletion of a tool electrode at this point of time, the transient state from the position a to the position d can be almost ignored. For this reason, by sending the tool electrode 100 on the skew with an appropriate feed angle α, it is possible to remove a layer with a specified machining depth.

In the technology disclosed in Japanese Patent Laid-Open Publication No. HEI 5-345228, a simulator for computing a value to correct depletion of the tool electrode 100 in the longitudinal direction thereof is provided, a feed angle α of the tool electrode 100 to the surface for electric discharge machining is computed by giving thereto values of a thickness E of a layer to be removed, a radius R of the tool electrode, and a depletion ratio U of the volume, and depletion of the tool electrode 100 in the longitudinal direction is compensated by inclined movement for removing the layer with a specified machining depth.

In this electric discharge machining, depletion of the tool electrode 100 in the longitudinal direction can be compensated by executing a feed in the inclined direction, so that a depleted area of a tool electrode in which a higher machining speed is realized can be utilized, whereby a machining efficiency can be improved.

To provide controls for correction against depletion as described above, theoretically, by giving data for a set machining depth per layer, a radius of the tool electrode, a cross area of the tool electrode, and a volume depletion factor to simulate a depletion rate of the tool electrode, an oblique feed angle of the tool electrode can analytically be decided before start of machining, however, in an actual machining, various types of conditions such as a temperature of a machining liquid and an amount of chips due to machining in a gap between the tool and the work for processing the work or the like change, and for this reason, the required thickness of a layer can not always be removed, so that sometimes an actual depletion rate may be different from the simulated one.

In a case where a form with a tapered side face is machined using only one type of path with a two-dimensional form, it is possible to substantially reduce computing steps in an NC program by machining a work into a layered form by gradually offsetting the outer outline path. However, in a case where only outer offset is changed, as shown in FIG. 15A and FIG. 15B, a gap T between the outer outline path Po and an inner outline path Pi gradually becomes narrower, and although a path for the tool electrode is prepared so that the tool electrode 100 is always partially superimposed thereon, when the overlap O is changed, as shown in FIG. 16A and FIG. 16B, according to the narrowed gap T, a take-out rate for machining for a constant electrode changes in accordance with change of the gap, which in turn changes the machining depth D for a layer.

As described above, in a case where a depletion rate of a tool electrode is simulated, it is required to compute a machining rate according to change of the path as well as to change the rate to be corrected against the depletion, however, it is extremely difficult to correct the depletion rate with high precision in accordance with a machining path overlapping adjacent electrode paths, so that it is substantially difficult to machine a work according to only a result of computational simulation due to an error between a result of computing and actual machining.

SUMMARY OF THE INVENTION

It is an object of the present invention to provide an electric discharge machining apparatus which can execute high-precision electric discharge machining to a form with a tapered side face by providing high precision controls over a position of the electrode according to machining parameters and a period of machining time required for the high-precision machining after the second work and on can be reduced in a case where additional works each having the same form are further machined, and also to provide an electric discharge machining method using the same.

In the electric discharge machining apparatus according to the present invention, two-dimensional outlines each indicating a path for machining, dimensions of a machined form, a feed rate in the axial direction of an electrode for movement of a tool electrode in the horizontal direction, and an interval of inline measurement are stored in the machining initial condition storing means, and in the initial machining step, electric discharge machining is executed according to the machining initial conditions stored in the machining initial condition storing means. The inline measuring means measures a measurement machining depth at each interval in the electric discharge machining process, and according to the machining depth value measured as described above, the machining parameter computing means newly computes machining parameters including a machining depth corresponding to each machining pass, a number of remaining machining passes, increment for outline offset, and after the machining parameters are newly computed for a first work, an electrode position controlling means provides positional control over the tool electrode according to the newly computed machining parameter.

In the electric discharge machining apparatus according to the present invention, machining parameters computed by a machining parameter computing means are stored in a newly obtained machining parameter storing means, and in a case where a plurality of works each having the same form are to be machined, the electrode position controlling means provides positional controls over a tool electrode using machining parameters stored in the newly obtained machining parameter storing means in machining for a second work and on.

In the electric discharge machining apparatus according to the present invention, the machining parameter computing means computes an estimated machining depth for a next machining pass to be included, depending on a value computed previously, a value computed last and the times of machining in a case where the machining depth for a machining pass changes each time measurement is executed.

In the electric discharge machining method according to the present invention, in the machining initial condition storing step, two-dimensional outlines each indicating a path for machining, dimensions of a machined form, a feed rate in the axial direction of the electrode for movement of the tool electrode in the horizontal direction, and a measurement interval are stored, and in the initial machining, electric discharge machining is executed according to the machining initial condition stored in the machining initial condition storing step. In the inline measuring step, a machining depth is measured at each measurement interval in the electric discharge machining process, and further in the machining parameter computing step, machining parameters such as a machining depth for one outline machining path, the number of times or passes of machining to be executed further, increment for outline offset are newly computed according to a measured value of the machining depth, and after machining parameters are newly computed for a first work, in the electrode position controlling step, positional control over the tool electrode are provided according to the newly computed machining parameters.

In the electric discharge machining method according to the present invention, machining parameters computed in a machining parameter computing step are stored in a storing means in a newly obtained machining parameter storing step; and positional control over a tool electrode are provided using the machining parameter stored in the storing means in the newly obtained machining parameter storing step for a second work and on in a case where a plurality of works each having the same form are to be machined.

In the electric discharge machining method according to the present invention, in a case where a machining depth for one outline machining path changes each time measurement is executed, an estimated machining depth for a next outline path is converted and computed according to a value computed previously, a value computed last, and times of machining in a machining parameter computing step.

Other objects and features of this invention will become understood from the following description with reference to the accompanying drawings.

BRIEF DESCRIPTION OF THE DRAWINGS

FIGS. 14A to 14E are explanatory views showing machining with a simple tool electrode using an electrode depletion correcting control;

DESCRIPTION OF THE PREFERRED EMBODIMENTS

Detailed description is made hereinafter for the electric discharge machining apparatus as well as the electric discharge machining method according to embodiments of the present invention with reference to the related drawings.

Figure 1:
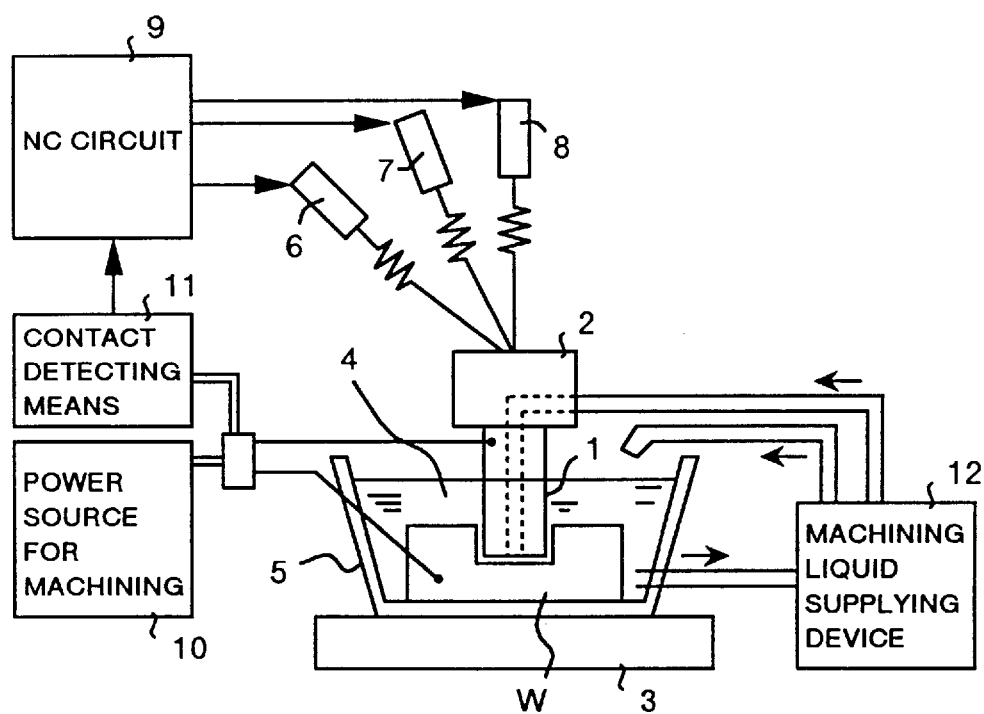
FIG. 1 is a schematic view showing general configuration of an electric discharge machining apparatus according Embodiment 1 of the invention.

FIG. 1 shows the electric discharge machining apparatus according to Embodiment 1of the present invention. The electric discharge machining apparatus comprises a hollow-body cylindrical tool electrode 1, a rotating device 2 for rotating the tool electrode 1 around the central shaft line, a machining bath 5 provided on a work table 3 with a machining liquid 4 stored therein for placing a work W for processing the work therein, axial driving means 6, 7, 8 for moving the tool electrode 1 and the work W relatively in the X-axial, Y-axial, and Z-axial directions respectively, an NC unit 9 for outputting an instruction for moving the tool electrode 1 according to data for a machining form as well as to other machining parameters, a power source 10 for machining for loading voltage in a section between the tool electrode 1 and the work W, a contact detecting means 11 for electrically detecting the contact of the tool electrode 1 with the work W, and a machining liquid supplying device 12 for circulating the machining liquid 4.

Figure 2:
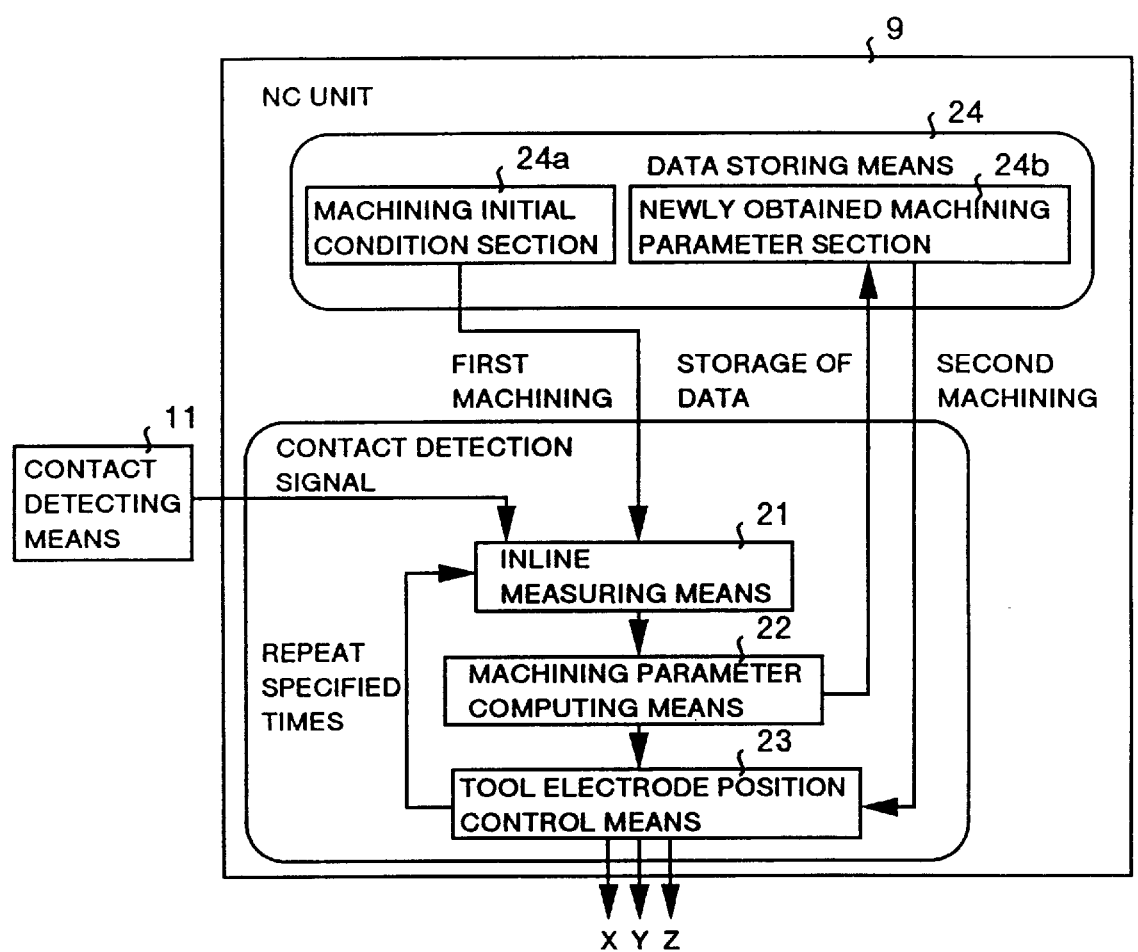
FIG. 2 is a block diagram showing general configuration of an NC device in the electric discharge machining apparatus according to the invention.

FIG. 2 shows configuration of the NC unit 9. The NC unit 9 comprises an inline measuring means 21, a machining parameter computing means 22, a tool electrode position control means 23, and a data storing means 24. The data storing means 24 comprises a machining initial condition section 24a and a newly obtained machining parameter section 24b.

Figure 3:
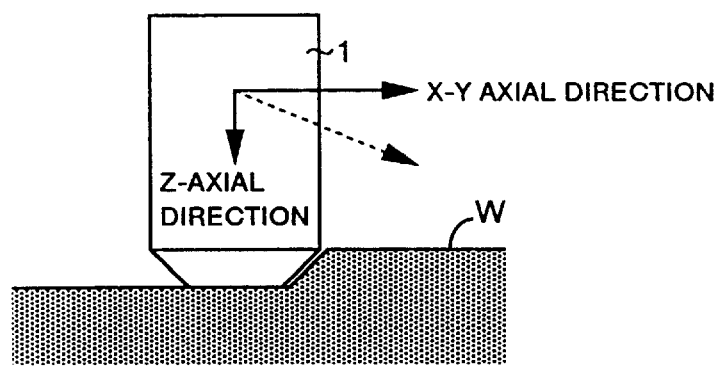
FIG. 3 is an explanatory view showing feed of a tool electrode in the z-axial direction for a movement of the tool electrode in the X and Y -axial directions.

The machining initial condition section 24a stores therein data mainly such as a path for a two-dimensional form of a machined form, a machining depth, a Z-axial correction rate, times of inline measurement (a frequency interval of inline measurement), times of initial machining, and also stores, in a case where the form has a tapered side face, data for machining initial conditions such as a maximum offset rate or the like. It should be noted that the Z-axial correction rate shows, as shown in FIG. 3, feed rates in the specified Z-axial direction (in the axial direction of the electrode) for movement of the tool electrode in the X-Y axial direction (horizontal movement).

The newly obtained machining parameter section 24b stores therein data such as a machining depth for one outline machining path, increment for offset for one outline machining path, and a result of times of machining in each of measuring zones each obtained during machining by the machining parameter computing means 22 described later.

The inline measuring means 21 receives a contact detection signal from the contact detecting means 11 each time when the outline machining path is executed a specified number of times or passes depending on number of times of initial machining as well as on intervals of inline measurement, and measures a machining depth according to the contact of the tool electrode edge face with the work W during the machining, namely along the inline, for transferring the measured data to the machining parameter computing means 22.

The machining parameter computing means 22 computes machining parameters such as a machining depth for one machining pass, the number of machining passes to be executed further, increment for outline offset according to a result of measuring a machining depth by the inline measuring means 21, and transfers those newly obtained machining parameters to the newly obtained machining parameter section 24b.

The tool electrode position control means 23 provides control over the movement in the XY directions to which the tool electrode 1 is moved on the path for specified two-dimensional form according to a path for two-dimensional form of a machined form, a machining depth, other machining parameters each given by the machining initial condition section 24a and the newly obtained machining parameter section 24b, and also provides control over the tool electrode 1 to be fed in a specified rate according to a set value of the Z-axial correction rate.

In this electric discharge machining apparatus, machining is executed according to the parameters set by the machining initial condition section 24a, and at this point of time, measurement of the depth making use of positioning of the contact between the tool electrode edge face and the work is executed by the inline measuring means 21 during the machining according to times of initial machining and set times of measurement. The various machining parameters are computed by the machining parameter computing means 22 depending on the data for this depth measurement, whereby the machining parameters are updated for executing high-precision machining. Also, when a plurality of works each having the same form are machined, works for a second work and on can be machined without measuring the depth thereof each time and by using the newly obtained parameters obtained by machining a first work.

Figure 4:
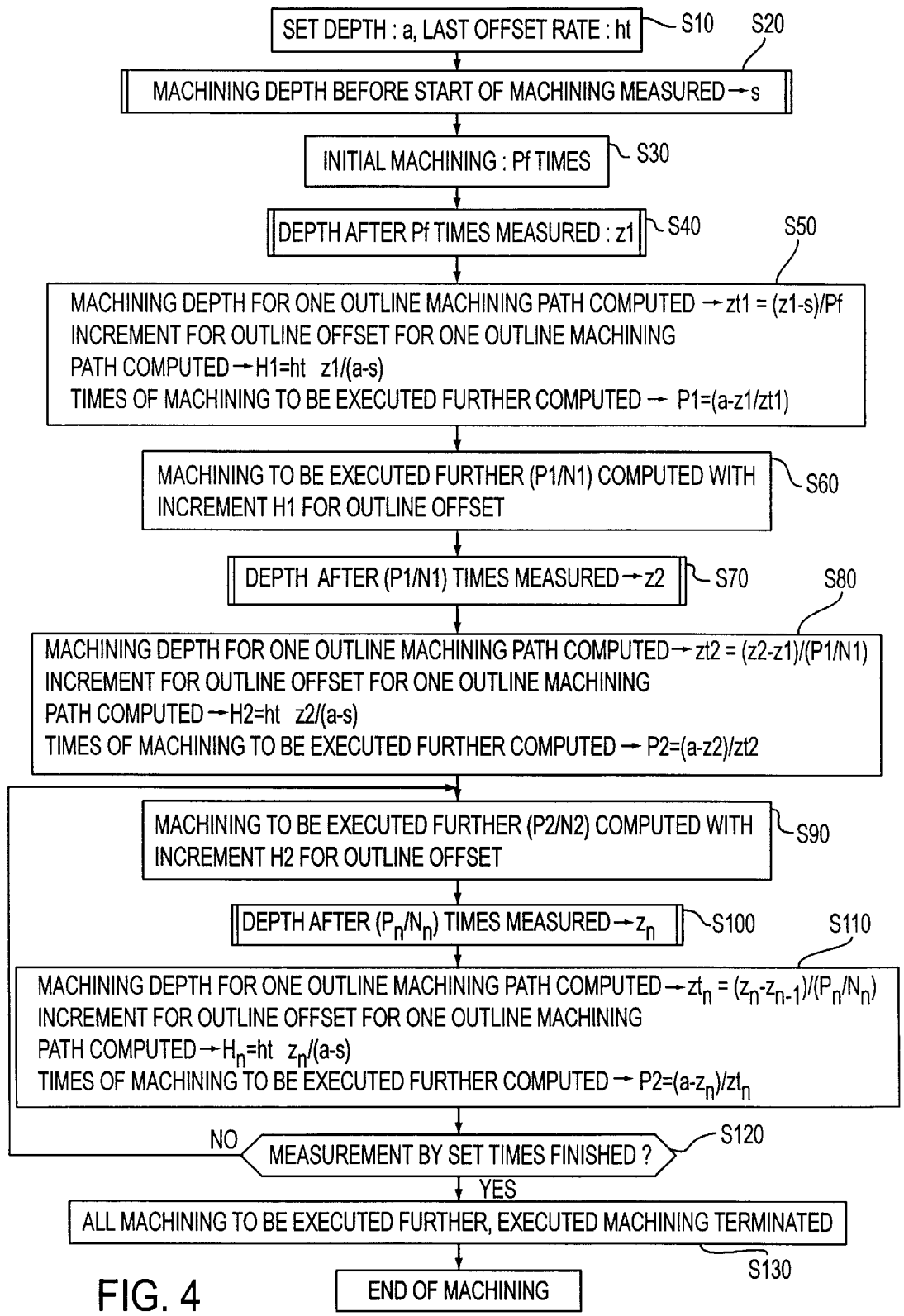
FIG. 4 is a flow chart showing a machining process in an electric discharge machining method of the present invention.
Figure 5:
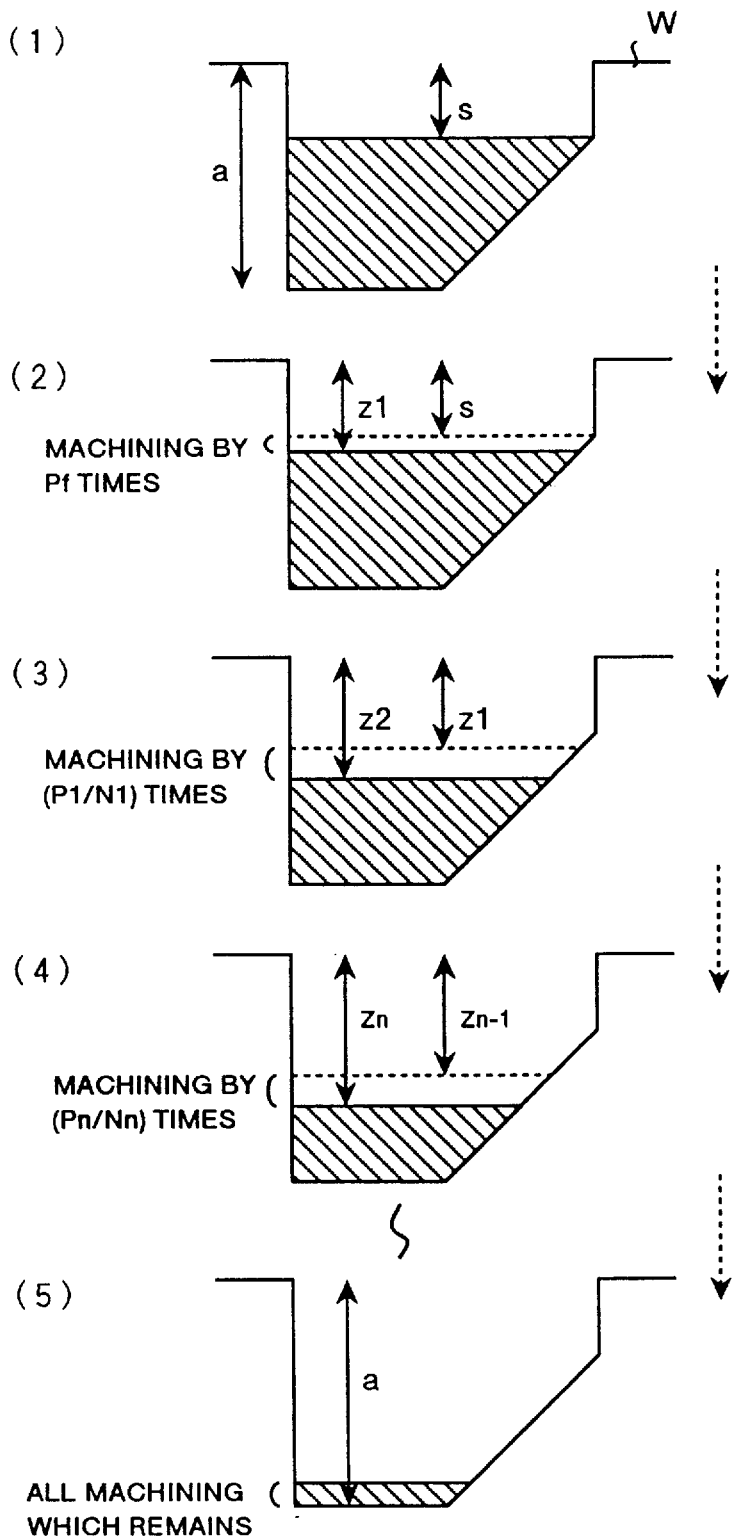
FIGS. 5 (1) to (5) are explanatory views showing change of a form in machining in the electric discharge machining method of the present invention.

Next description is made for machining processes for machining an initial form (machining of the first work) according to initial machining conditions with reference to FIG. 4 and FIGS. 5 (1) to 5 (5).

At first, a set depth (a machining depth) a and a last offset rate (a maximum offset rate) ht are fetched (step S10), the machining depth s before start of machining shown in FIG. 5 (1) is measured by the inline measuring means 21 (step S20), and an initial machining is executed over times of initial machining Pf (step S30).

When the initial machining is executed by the initial machining number of times or passes Pf, the measured depth value z1 when the initial machining is completed is obtained as shown in FIG. 5 (2) by measuring the depth by the inline measuring means 21 (step S40).

Then, the machining parameter computing means 22 computes a machining depth zt1for one outline machining path, increment H1 for outline offset for one outline machining path, and number of times P1 of machining to be executed further according to the below expression (step S50).

Namely, $zt1=(z1-s)/Pf$ $H1=ht \blacksquare z1/(a-s)$ $P1=(a-z1)/zt1$

Then the machining is restarted, but in this step, machining is not executed by the computed remaining number of times or passes P1 all at once, and the machining parameters are computed again by measuring depth each time machining is executed by number of times divided depending on a frequency of measurement for correcting the machining conditions.

Accordingly, when the initial machining is completed, machining to be executed further (P1/N1) is executed with the increment H1 for outline offset (step S60), the inline measuring means 21 measures a machining depth z2 after machining is executed by (P1/N1) times as shown in FIG. 5 (3) (step S70), and the machining parameter computing means 22 computes again a machining depth zt for one outline machining path or pass, increment H2 for outline offset for one outline machining path or pass, and the number of times P2 of machining to be executed further according to the below expression.

Namely, the following expressions are applicable:

$zt2=(z2-z1)/(P1/N1)$ $H2 = ht \blacksquare z2/(a-s)$ $P2 = (a-z2)/zt2$

Then, machining to be executed further (P2/N2) is executed by the increment H2 for outline offset (step S90), and thereafter, the inline measuring means 21 measures a Machining depth zn each time machining is executed by $(P_n/N_n)$ times as shown in FIG. 5 (4) (step S100), then the machining parameter computing means 22 computes a machining depth $zt_n$ for one outline machining path or pass, increment $H_n$ for outline offset for one outline machining path or pass, and the number of times $P_n$ of machining to be executed further according to the below expression (step S110), and those values are repeatedly updated until the set times of measurement are ended (step S120, affirmative).

Namely, the following expressions are applicable:

$zt_n = (z_n - z_n - 1)/(P_n/N_n)$ $H_n = ht \blacksquare z_n/(a-s)$ $P_n = (a - z_n)/zt_n$ When measurement has been executed by the set times (step S120, affirmative), all of the machining to be executed further is executed for completing the machining of the depth a (step S130).

Figure 6:
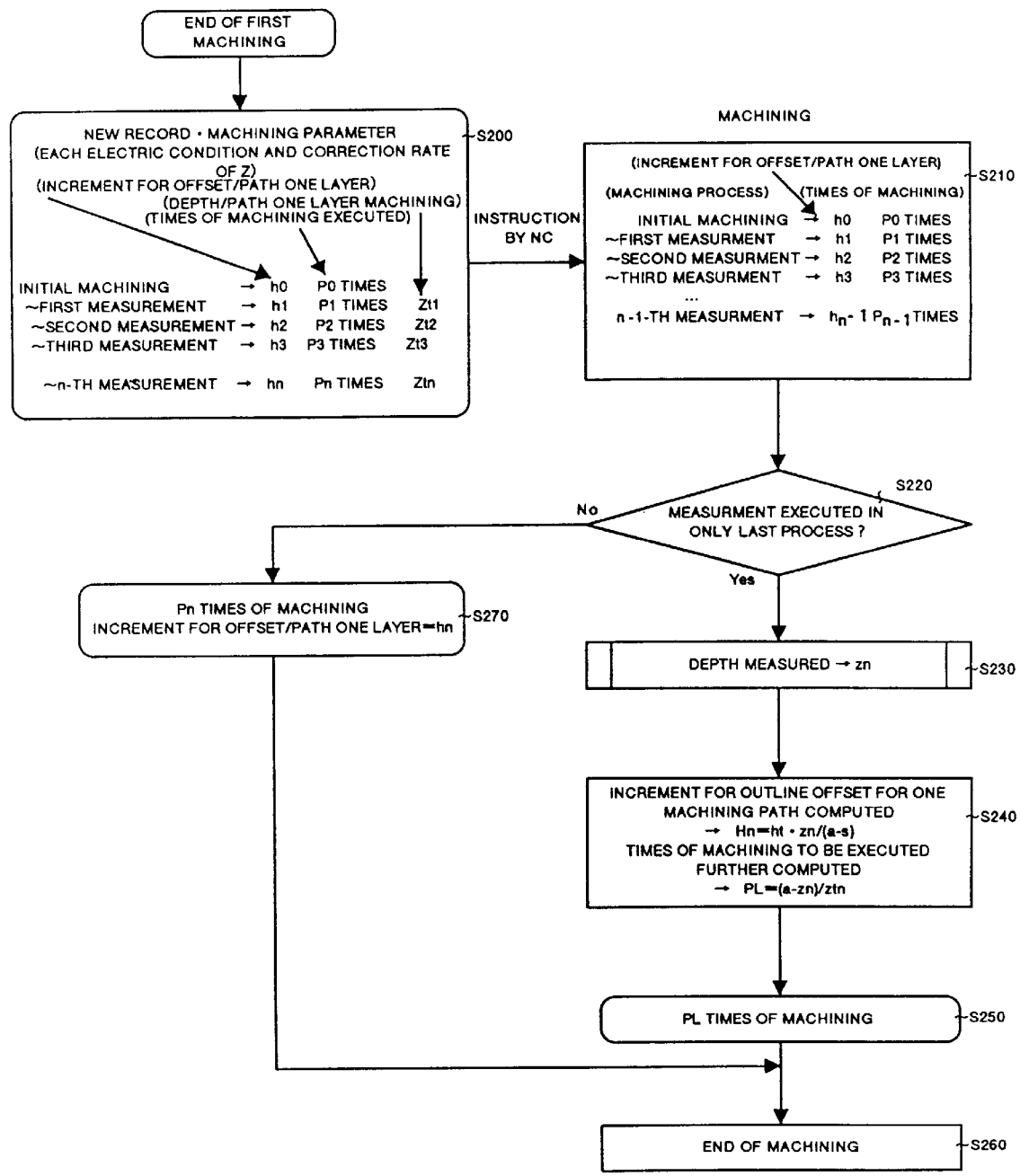
FIG. 6 is a flow chart showing a machining process in a case where machining for a second work and on is executed in the electric discharge machining method according to the present invention.

FIG. 6 shows machining processes after a second work and on in a case where a plurality of works each having the same form are executed. Machining parameters such as increment h0 to hn for outline offset for one outline machining path, the number of times P0 to Pn of machining to be executed, a machining depth Ztn for one outline machining path or the like are recorded in the newly obtained machining parameter section 24b when machining for the second work and on is to be executed because the machining parameters have been obtained from the first machining already executed.

Accordingly, when machining for the second work and on is executed, the machining parameters recorded in the newly obtained machining parameter section 24b are read out until the immediately preceding machining in the last processes, namely n−1 times of machining are completed (step S200), and the same machining as that for the first work is executed according to the machining parameters (step S210).

In a case where higher-precision machining is required (step S220, affirmative), a depth for one process only in the last process is executed (step S230), then the machining parameter computing means 22 computes increment Hn for outline offset for one outline machining path and the number of times PL of machining to be further executed according to the measured depth value zn (step S240), and machining is executed by the PL number of times of machining with the increment Hn for outline offset (step S250), then the machining is terminated (step S260).

Namely, the following expressions are applicable:

$Hn = ht \blacksquare zn/(a-s)$ $PL = (a-zn)/ztn$

With this operation, precision of the last depth can be maintained at a high level.

It should be noted that, in a case where measurement of a depth for one process only in the last processes is not executed (step S220, negative), machining is executed Pn number of times with the increment h for outline offset recorded in the newly obtained machining parameter section 24b (step S270), and then the machining is terminated (step S260).

Next description is made for an example of applying a simple pipe tool electrode to form machining. A desired form machined in this machining has an inclination with a tapered angle θ in one of the side faces as shown in FIG. 7A.

Figures 7A, 7B:
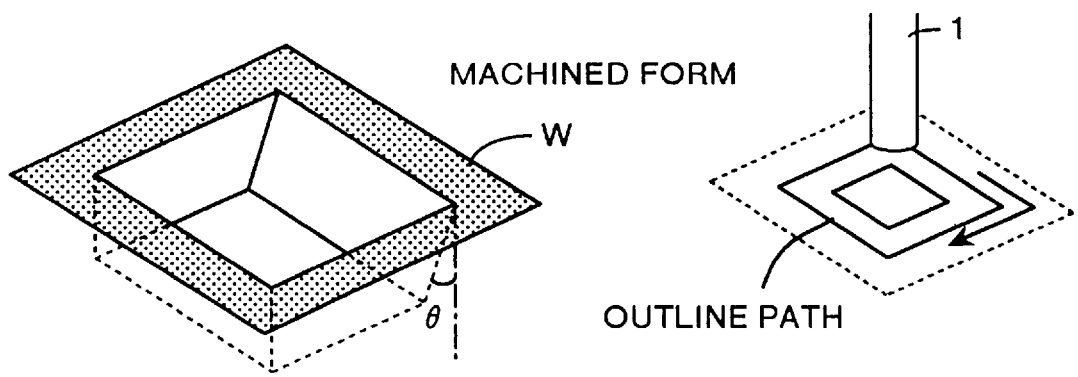
FIG. 7A is a perspective view showing an example of a form machined in the electric discharge machining method according to the present invention.
FIG. 7B is a perspective view showing a two-dimensional outline for an movement of an electrode in the electric discharge machining method according to the present invention.

The two-dimensional outline machining path for movement of the tool electrode for machining is shown in FIG. 7B. This machining path is executed along a two-dimensional path in the horizontal direction, and machining with a specified depth can be executed with a layer basis by executing the pass a plurality of times.

Figures 8A, 8B, 8C:
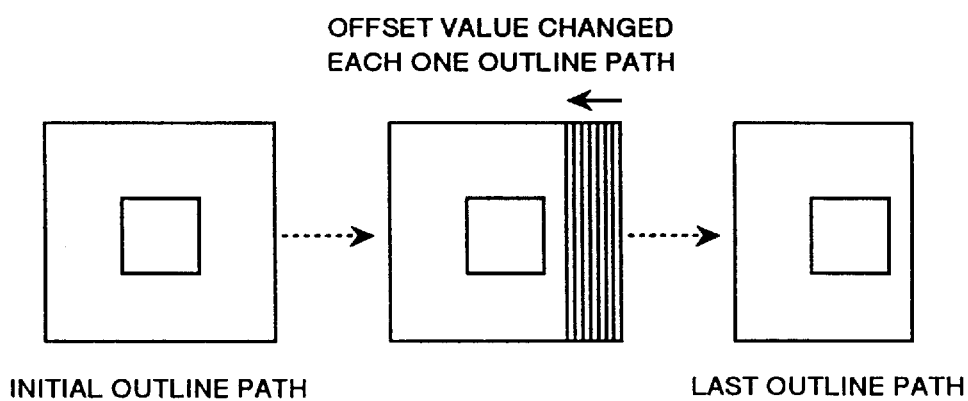
FIGS. 8A to 8C are plan views showing a change of outline path offset in taper machining.

In a case where a side form is vertical, an initial outline path is just repeatedly executed as far as the set depth, but in a case where the side form is a tapered one, as shown in FIG. 8A to FIG. 8C, an arbitrary tapered form can be obtained by changing the offset for the outline path by desired increment. In a case where only one of four side faces is tapered herein, as shown in FIG. 7A, a specified tapered form can be obtained by making the outline path partially offset.

Increment for offset to be changed for one outline path can be obtained according to a machining depth for a layer computed from the machining depth as described above. For this reason, in order to execute machining for a tapered form with high precision, it is required to obtain an accurate value of "machining depth/a layer".

Figure 9A:
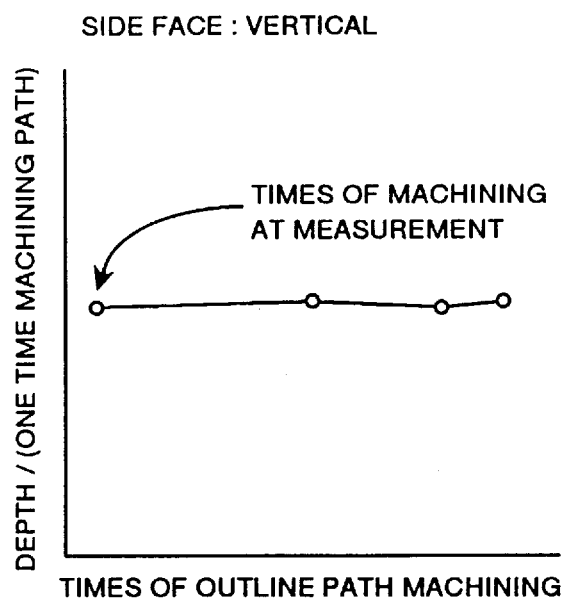
FIGS. 9A and 9B are graphs showing "a machining depth/layer" computed after measurement of the depth.
Figure 9B:
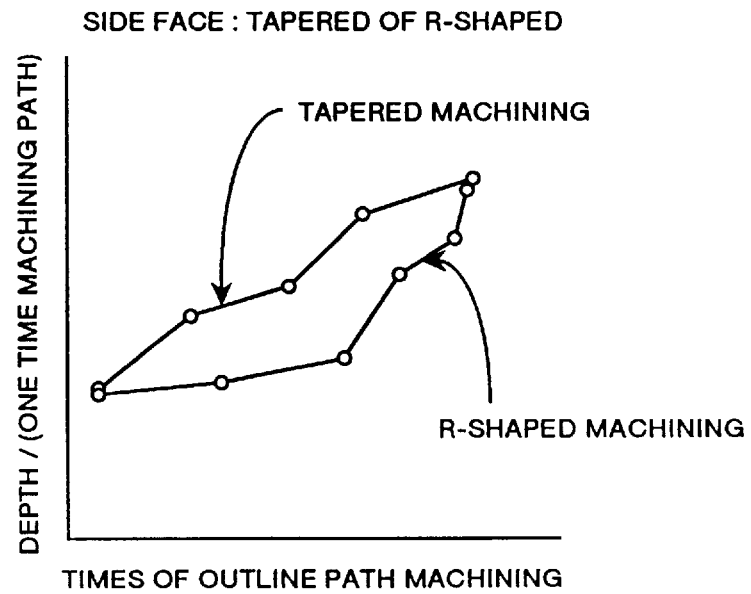

FIG. 9A and FIG. 9B are graphs showing how the value of "machining depth/a layer" computed after the depth is measured changes according to a side form. In a case where the side face is vertical, as shown in FIG. 9A, the same machining path is just repeated, so that it can be considered that the value of "machining depth/a layer" is substantially constant. However, in a case where the side face is tapered or has a R-shaped face, as shown in FIG. 9B, the value of "machining depth/a layer" computed each time measurement is executed changes depending on times of executed pass (a machining depth).

This phenomenon occurs because a gap between machining paths is not kept constant as the inside path is fixed when the outline path is offset. For this reason, a take-out rate for machining to an area of the tool electrode changes according to a change of offset, as a result, a value of "machining depth/a layer" changes each time measurement is executed. Increment for offset is also computed from the value of "machining depth/a layer", so that, if measurement is not executed so often, a side form becomes like that shown in FIG. 10A according to a change rate of the value of "machining depth/a layer". Namely, the machined form results in a distorted one due to increment for offset to be corrected each time measurement is executed because the times of measurement are not enough for obtaining accurate increment for offset to be corrected.

Figure 10A:
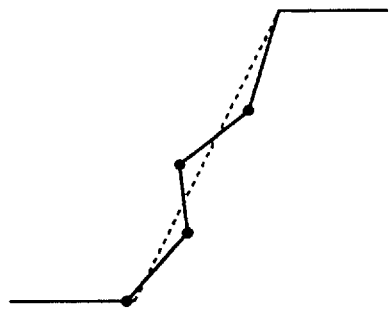
FIGS. 10A and 10B are explanatory views showing a change of taper machining form according to times of measurement.
Figure 10B:
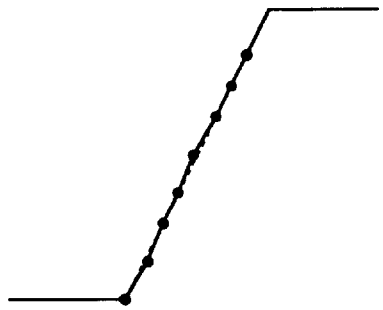

As a method for solving this problem, as shown in FIG. 10B, times of measurement may be increased. By increasing a frequency of measurement, it is possible to obtain an extremely smooth side form. It should be noted that, in a case where times of measurement are increased for improving the precision, a total period of time required for machining increases more and more due to increase of time for measurement.

Figure 11:
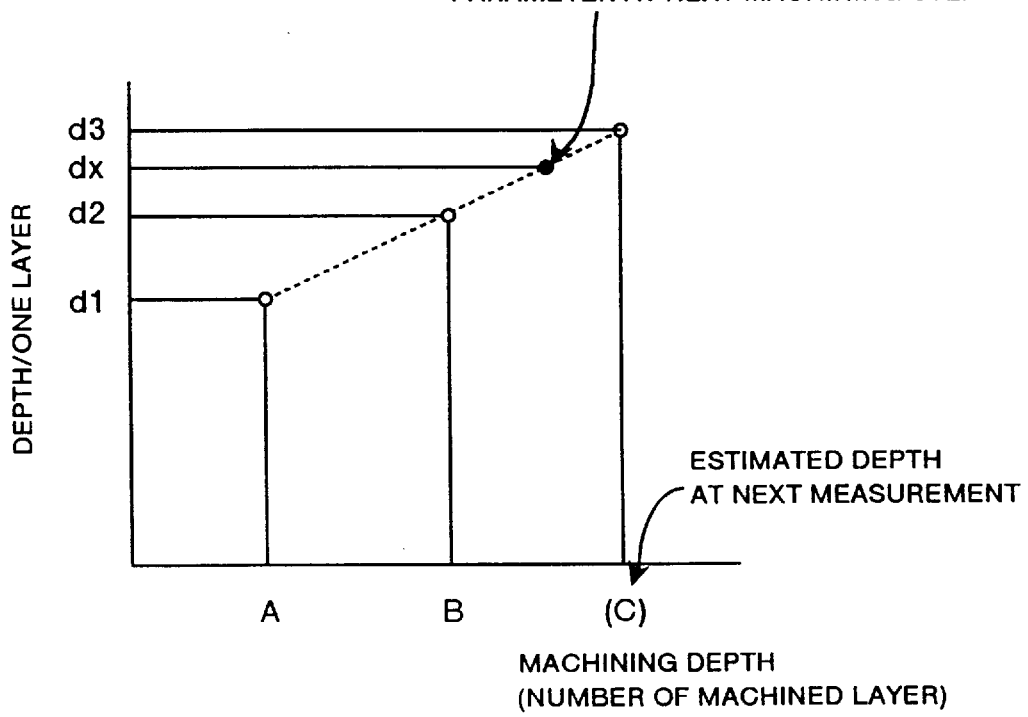
FIG. 11 is a graph showing an example of conversion of a machining depth parameter per layer.

As shown in FIG. 10B, the tapered side face has a form as indicated by the broken line each time measurement is executed because the machining depth for one machining path changes as shown in FIG. 9B even if times of measurement are increased. For this reason, the machining parameter computing means 22 compares the machining depth d1 for one machining path or pass (a layer) measured previously to the machining depth d2 measured last as shown in FIG. 11, and can compute a machining depth d3 for one pass (a layer) when the next measurement is executed as follows.

Namely, the following expression is applicable:

$$d3 = C(d2-d1)/(B-A)$$

For actual machining, it is possible to execute machining with an extremely small amount of error in the form by using the value d2 measured last as well as an average value when the next measurement is executed, namely the average value obtained by computing dx described below for computation the number of times machining to be executed further as well as increment for offset.

Namely, the following expression is applicable:

$$dx = (d2-d1)(B+C)/(B-A)$$

As described above, in a case where the last electric discharge machining apparatus is used, as shown in FIGS. 10A and 10B, different from the case where the side face is machined to be vertical, it is necessary to divide a series of measurement into a large number of portions. However, as shown in the figure, with the first form machining, data for times of machining as well as for increment for offset in each of the processes are stored as newly obtained data. And for this reason, in the machining for a second work and on, the total period of time required for machining can be estimated according by summing a real period of time for machining required each time.

Figure 12:
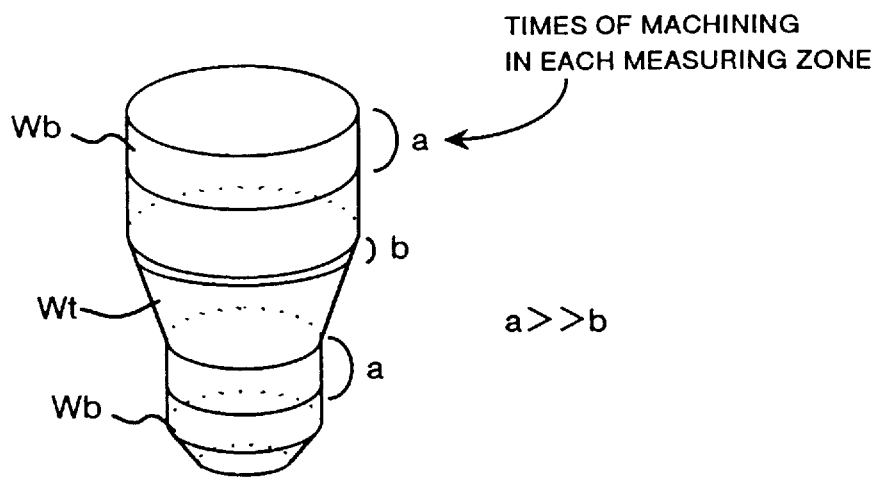
FIG. 12 is a perspective view showing a concrete example of machining a form including a vertically machined section and a tapered section.

FIG. 12 shows a concrete machined form including a vertically machined section and a tapered machined section. In a case where the form shown in FIG. 12 is machined with a simple tool electrode, times of measurement is reduced and times of machining a in each of measuring zones is increased in the vertically machined section Wb, while times of measurement is increased and times of machining b in each of the measuring zones is reduced in the taper-machined section Wt, so that both of improvement in precision for a form and reduction of machining times can be achieved according to the set conditions of a>>b.

Figure 13:
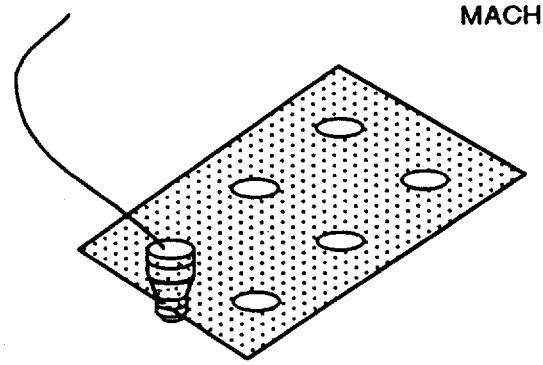
FIG. 13 is a perspective view showing an example of an embodiment in a case where a plurality of works each having the same form are to be machined.
Figure 15A:
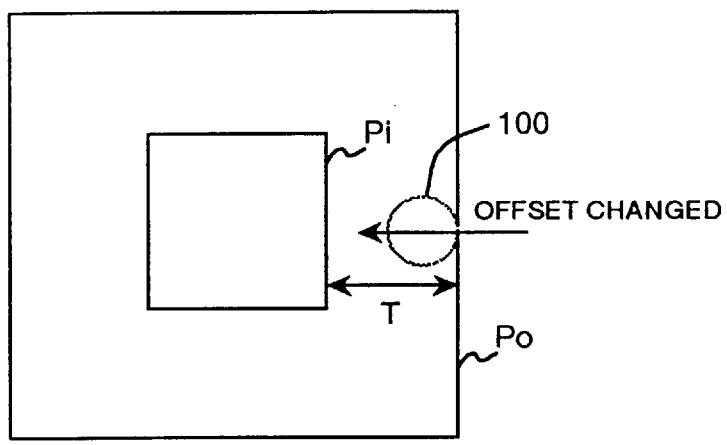
FIGS. 15A and 15B are plan views showing a change of outline offset.
Figure 15B:
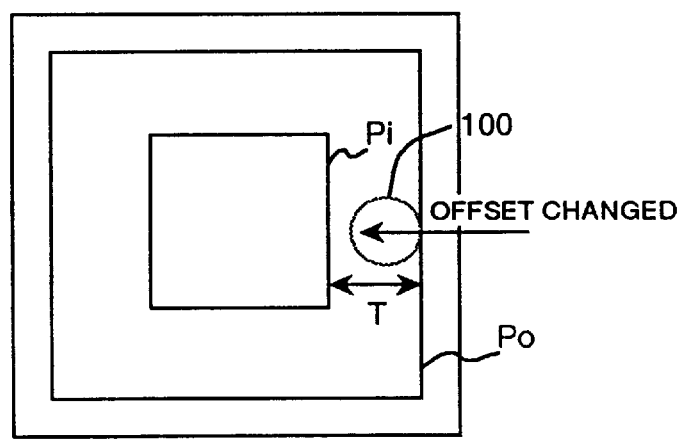
Figure 16A:
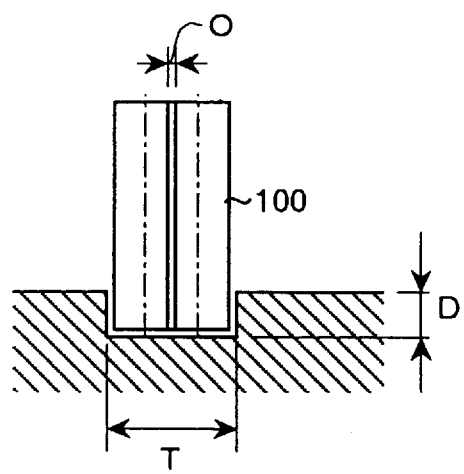
FIGS. 16A and 16B are explanatory views showing a change of machining characteristics according to a change of outline offset.
Figure 16B:
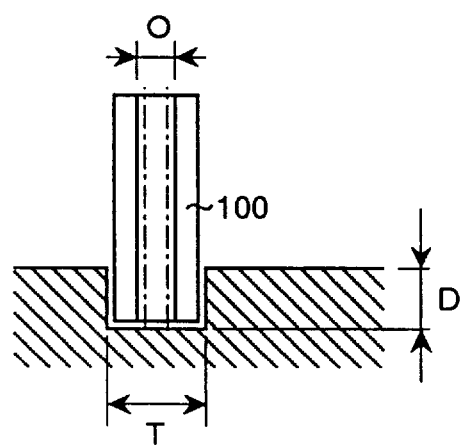

Also, as shown in FIG. 13, in a case where a plurality of works each having the same form as that shown in FIG. 12 are to be machined, by using the computed machining parameters obtained by machining the first work for machining a second work and on, a total period of time required for machining the second work and on is substantially equivalent to a period of time required for electric discharge machining, and or this reason a period of time for measurement can be reduced.

As understood from explanation made above, with the electric discharge machining apparatus according to the present invention, electric discharge machining is executed according to initial machining conditions stored in the initial machining condition storing means in the initial machining step; when the inline measuring means measures a machining depth, a machining parameter computing means newly computes machining parameters such as a machining depth for a machining pass, the number of times of machining to be executed further, increment for outline offset according to a measured value of the machining depth; and after machining parameters are newly computed for a first work, positional control over a tool electrode is provided according to the newly computed machining parameters; whereby regardless of a change in depletion rate of a tool electrode or in a machining depth for one machining pass, positional control over the tool electrode can be provided with higher precision and also machining of a form can be executed with higher precision even in taper machining such as machining a groove in an approximately V-shaped cross section.

With the electric discharge machining apparatus according to another feature of the present invention, positional control over a tool electrode is provided using machining parameters stored in the newly obtained machining parameter storing means in machining for a second work and on in a case where a plurality of works each having the same form are to be machined; whereby in machining for a second work and on, total time for machining is substantially shortened with the machining precision kept at a high precision level.

With the electric discharge machining apparatus according to another feature of the present invention, in a case where the machining depth for a machining pass changes each time measurement is executed, an estimated machining depth for a next pass is computed depending on a value of a machining depth computed previously, the value computed last and the number of times of machining, so that it makes possible to execute three-dimensional machining with higher precision.

As for an electric discharge machining method according to another feature of the present invention, in an initial machining, electric discharge machining is executed according to machining initial conditions stored in the machining initial condition storing step; when a machining depth is measured in an inline measuring step, in a machining parameter computing step, machining parameters such as a machining depth for one machining pass, times of machining to be executed further, increment for outline offset are newly computed according to a measured value of the machining depth; and after a machining parameter is newly computed for a first work, in an electrode position controlling step, positional control over the tool electrode is provided according to the newly computed machining parameter; whereby, regardless of a change in depletion rate of a tool electrode or in a machining depth for one outline machining path, positional control over the tool electrode can be provided with higher precision and machining of a form can be executed with higher precision even in taper machining such as machining a groove in an approximately V-shaped cross section.

In the electric discharge machining method according to another feature of the present invention, positional control over a tool electrode is provided using machining parameters stored in a storing means for a second work and on in a case where a plurality of works each having the same form are to be machined, so that, in machining for a second work and on, total time for machining can substantially be shortened with the machining precision at a high level.

In the electric discharge machining method according to another feature of the present invention, in a case where a machining depth for one machining pass changes each time measurement is executed, an estimated machining depth for a next pass is converted and computed according to a value computed previously, a value computed last, and times of machining, so that it is possible to execute three-dimensional machining with higher precision.

This application is based on Japanese patent application No. HEI 8-290940 filed in the Japanese Patent Office on Oct. 31, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electric discharge machining apparatus for imposing a voltage across a tool electrode and a work for processing the work into a desired form by three-dimensional control comprising:

an initial machining condition storing means for storing therein a two-dimensional outline indicating a path for machining, dimensions of a machined form, a feed rate in the axial direction of the electrode for a given movement of the tool electrode in the horizontal direction, and an interval of inline measurement;

an inline measuring means for measuring a machining depth at each said interval;

a machining parameter computing means for computing machining parameters including a machining depth for each machining pass, a number of remaining machining passes, and an increment for outline offset according to the machining depth measured by said inline measuring means; and an electrode position control means for providing positional control over the tool electrode according to the machining parameters computed by said machining parameter computing means.

2. An electric discharge machining apparatus according to claim 1;

wherein said machining parameter computing means compares a computed value of a machining depth for a previous machining pass with that of a current machining path when the machining depth varies with each depth measurement, and computes an estimated machining depth for the next machining pass depending on the value computed previously, the current value, and the number of machining passes.

3. An electric discharge machining apparatus according to claim 1 comprising a newly obtained machining parameter storing means for storing therein machining parameters by said parameter computing means; wherein said electrode position control means provides positional controls over said tool electrode using machining parameters stored in said newly obtained machining parameter storing means in machining for a second work and in a case where a plurality of works each having the same form are to be machined.

4. An electric discharge machining apparatus according to claim 3; wherein said machining parameter computing means compares a computed value of a machining depth for a previous machining pass with that of a current machining pass when the machining depth varies with each depth measurement, and computes an estimated machining depth for the next machining pass depending on the value computed previously, the current value, and the number of machining passes.

5. An electric discharge machining method for imposing a voltage across a tool electrode and a work to process the work into a desired form by three-dimensional control comprising the steps of:

storing initial machining conditions such as two-dimensional outline indicating a path for machining, dimensions of a machined form, a feed rate in the axial direction of the electrode for movement of the tool electrode in the horizontal direction, and an interval of inline measurement;

executing an inline measurement for measuring a machining depth at each said interval;

computing machining parameters including a machining depth for each machining pass, a number of times of remaining passes, and an increment for outline offset according to the machining depth measured in said inline measurement step; and providing positional control over the tool electrode according to the machining parameters computed by said machining parameter computing means.

6. An electric discharge machining method according to claim 5; wherein, in a case where a machining depth for a machining pass changes with each depth measurement executed during a machining step, a previous computed value of machining depth for a machining pass is compared to a current computed value of machining depth and an estimated machining depth for the next machining pass is converted and computed according to the previous computed value, the current computed value, and the number of passes.

7. An electric discharge machining method according to claim 5 comprising a newly obtained machining parameters storing step in which a machining parameter computed in said machining parameter computing step is stored in the storing means; wherein positional control over said tool electrode is provided using the machining parameter stored in the storing means for a second work and in a case where a plurality of works each having the same form are to be machined.

8. An electric discharge machining method according to claim 7; wherein, in a case where a machining depth for a machining pass changes with each depth measurement executed during a machining step, a previous computed value of machining depth for a machining pass is compared to a current computed value of machining depth and an estimated machining depth for the next machining pass is converted and computed according to the previous computed value, the current computed value, and the number of passes.

* * * * *